US006557229B1

(12) United States Patent
Ricci

(10) Patent No.: US 6,557,229 B1
(45) Date of Patent: May 6, 2003

(54) POSITIONING TOOL FOR INSTALLING FOOD WASTE DISPOSERS

(76) Inventor: Rudolph V. Ricci, 2001 Marina Dr. Apt. 606, N. Quincy, MA (US) 02171-1543

( * ) Notice: Subject to any disclaimer, the term of this patent is extended or adjusted under 35 U.S.C. 154(b) by 0 days.

(21) Appl. No.: 10/063,623

(22) Filed: May 3, 2002

(51) Int. Cl.[7] .................................................. B23P 19/04
(52) U.S. Cl. ........................................... 29/266; 269/49
(58) Field of Search ........................... 259/100; 269/49; 29/266, 238, 263

(56) References Cited

U.S. PATENT DOCUMENTS 2,746,062 A * 5/1956 Waltz .......................... 269/49
3,007,241 A * 11/1961 Gonzalez ..................... 29/266
3,270,407 A * 9/1966 Araujo ....................... 254/100
4,175,734 A * 11/1979 Williams ..................... 269/49
4,205,421 A * 6/1980 Martinez-Machin ......... 29/263
5,177,853 A * 1/1993 Herook ........................ 29/266
5,839,647 A * 11/1998 Orne ........................... 269/49

* cited by examiner

*Primary Examiner*—Robert C. Watson
(74) *Attorney, Agent, or Firm*—Mark P. White

(57) ABSTRACT

A tool to assist in the installation of a waste disposer beneath a kitchen sink includes a central, threaded shaft with a flared bottom end supporting a lift plate which is cocked on the shaft so that it may be inserted into the top of the waste disposer. The tool further contains a threaded stabilizing plate which mates with the threaded shaft, and which is inserted and retained in the top of the sink strainer, so that the shaft and lift plate extend through the sink strainer and into the waste disposer beneath. When the lift plate is straightened on the shaft, and the shaft rotated relative to the stabilizing plate, the waste disposer is drawn up until it engages the adapter on the sink strainer, to which it attaches.

4 Claims, 13 Drawing Sheets

POSITIONING TOOL FOR INSTALLING FOOD WASTE DISPOSERS

BACKGROUND OF THE INVENTION

Food Waste Disposers have become commonplace in modern American kitchens. These appliances mount beneath the kitchen sink, and grind waste into a liquid or puree, which is then led into the drain system to which the sink is normally attached.

Referring now to FIG. 1, a typical such system is shown. The waste disposer 6, attaches to the strainer 4 which in turn is affixed to the sink. Electrical power to drive the grinder is routed to the disposer by means of conduit 8. The ground or pureed waste exits the disposer through drain pipe 10.

The waste disposer can be troublesome to install, however, due to a combination of the close quarters encountered by the plumber beneath the sink, and because of the weight and awkwardness of handling the disposer itself.

In fact, many a plumber has experienced back injuries caused when trying to lift the waste disposer into position with one hand, while trying to align it and secure it in position with the other hand, all the while on his knees in front of a base cabinet containing the sink. This invention not only makes the installation faster and easier, but eliminates the risk of such back injury.

Referring to FIG. 2, a typical prior art installation system is depicted. The strainer 12 is inserted into the sink 2, and an adapter 4 is screwed onto the strainer 12 using a sealing washer 14 to help create a water-tight seal. The top of the disposer body must then be rotated about the adapter to secure the disposer to the sink. Rotating the disposer relative to the adapter, while keeping the two components aligned, can be time consuming and frustrating, especially for a plumber working alone on the installation.

The present invention provides a simple tool to facilitate this installation, providing for the lifting of the disposer and maintaining the disposer in place beneath the sink strainer and adapter, allowing the plumber to rotate the disposer while maintaining the alignment required.

SUMMARY OF THE INVENTION

It is an object of the present invention to provide a tool to assist in the installation of waste disposers in kitchen sinks.

In accordance with one aspect of the invention, the tool includes a threaded shaft, a stabilizing plate through which the shaft passes, and which is inserted and retained in the sink strainer, and a lift plate through which the shaft passes, which is cocked to permit passage through the sink strainer and into the top of the waste disposer located below the sink.

In accordance with a second aspect of the invention, the shaft threads mate with a nut attached to the stabilizing plate, so that rotating the shaft raises or lowers the lift plate relative to the stabilizing plate.

In accordance with a third aspect of the invention, the lift plate has a central hole with a diameter sufficiently larger than the diameter of the shaft to allow the lift plate to be cocked for insertion into the top of the waste disposer.

In accordance with a third aspect of the invention, the attachment between the nut is accomplished by means of two or more lift arms.

In accordance with a fourth aspect of the invention, a rotatable handle is provided, which can be aligned with the axis of the shaft, or can be disposed at right angles to the shaft to facilitate rotating the shaft.

In accordance with a fifth aspect of the invention, the lift plate is in the form of an elongated rectangle wherein the opposing shorter sides are curved.

In accordance with a sixth aspect of the invention, the lift plate contains ridges on the upper surface to stabilize the lift plate within the waste disposer.

In accordance with a seventh aspect of the invention the stabilizing plate is circular, and contains a ring attached to the lower surface which fits within the sink strainer, stabilizing it within the strainer.

In accordance with an eighth aspect of the invention the stabilizing plate is substantially rectangular in shape, and the threaded member has one or more threaded member flanges which mate with the stabilizing plate, preventing the threaded member from rotating relative to the stabilizing plate when so mated.

In accordance with a ninth aspect of the invention the threaded member flanges capture the stabilizing plate within the flanges when the threaded member flanges are mated with the stabilizing plate.

BRIEF DESCRIPTION OF DRAWINGS

These, and further features of the invention, may be better understood with reference to the accompanying specification and drawings depicting the preferred embodiment, in which.

DETAILED DESCRIPTION

Figure 1:
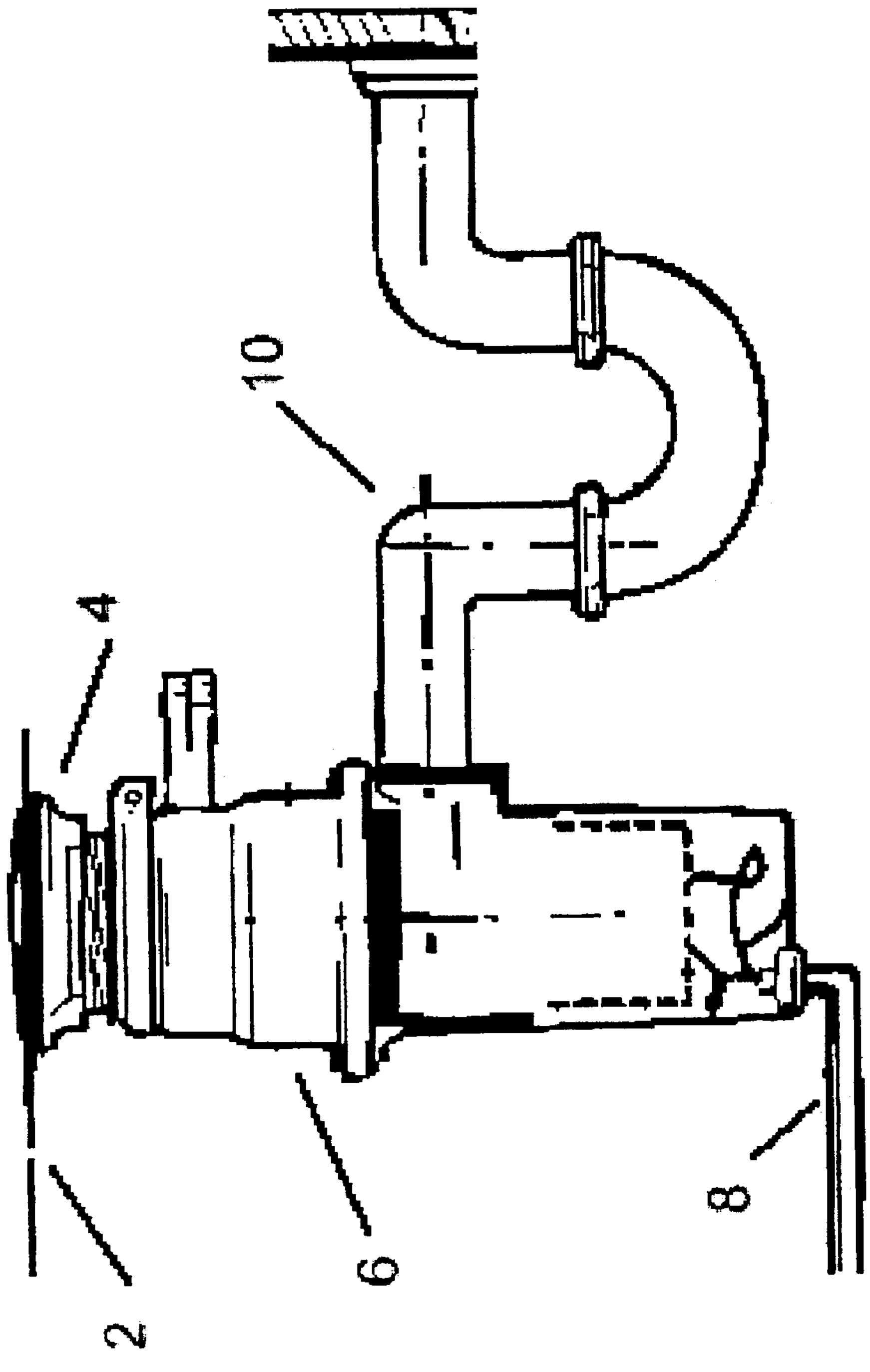
Fig 1. (Prior Art)
FIG. 1 depicts a typical waste disposer prior art installation beneath a sink.
Figure 2:
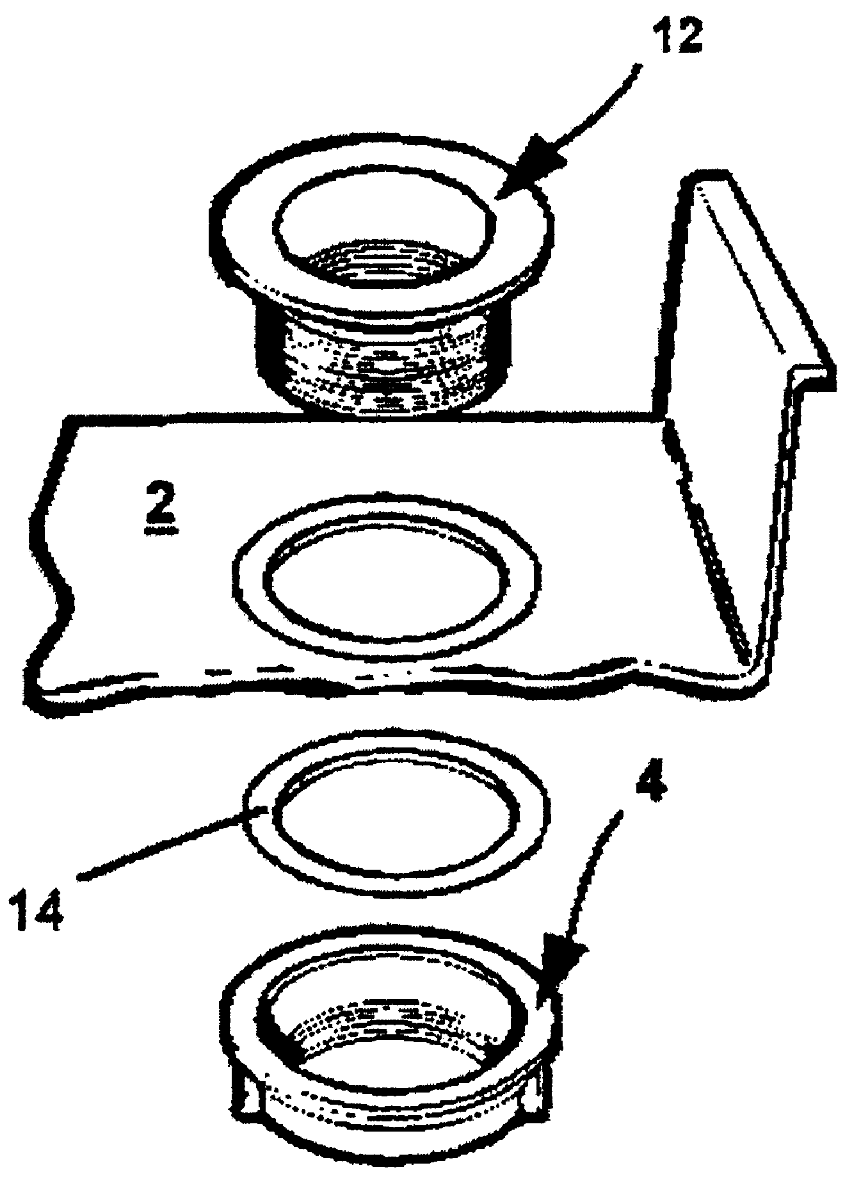
Fig 2. (Prior Art)
FIG. 2 depicts a typical prior art installation of a strainer and adapter for a waste disposer system.

As previously described, the present invention supports the waste disposer body below the sink, in proximity to adapter 4 which attaches to the sink strainer 12, as shown in FIG. 2.

Figure 3:
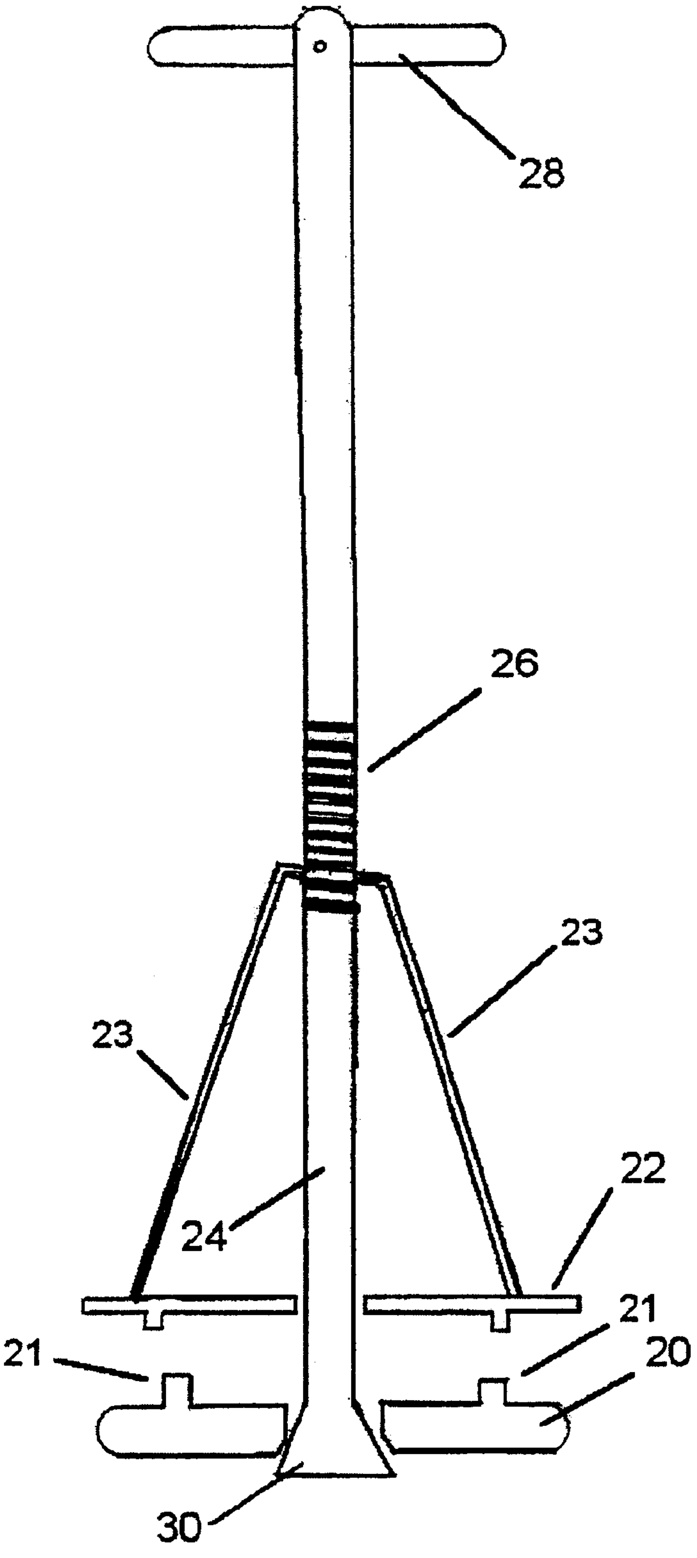
FIG. 3 depicts an embodiment of the present invention, utilizing lift arms between the lift screw and the strainer plate.

The tool itself is shown in a first embodiment in FIG. 3. It consists of a shaft 24, having a rotatable handle 28 at the top end, and a flared bottom end 30. A lift plate 20 rests on the flared end, and is intended to be inserted within the waste disposer itself, as shown in FIG. 5.

Figure 5:
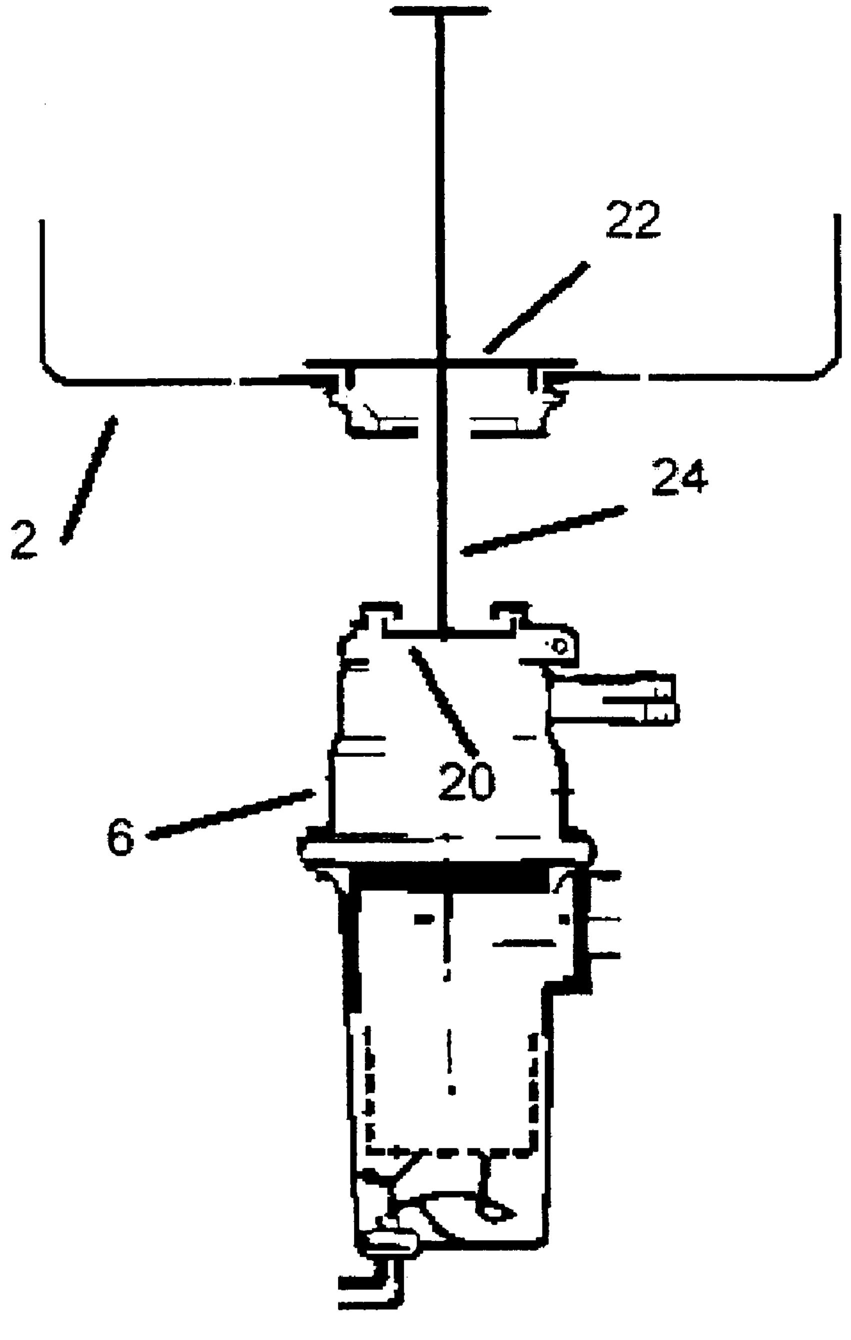
FIG. 5 depicts the present invention in use in the installation of the waste disposer.
Figure 7:
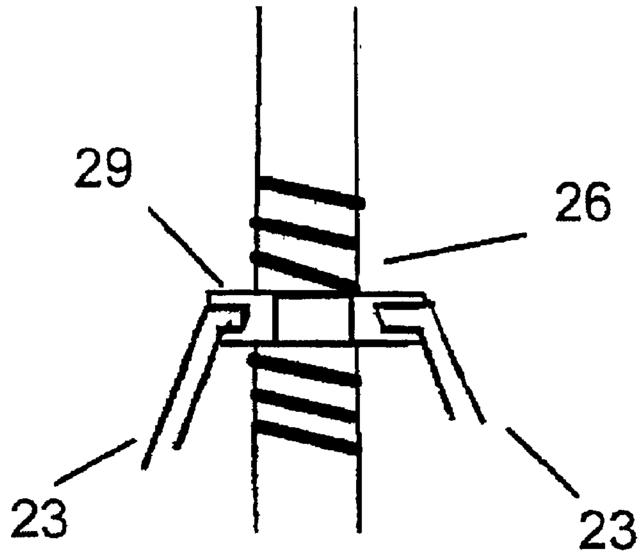
FIG. 7 depicts the attachment of the lift arms to the lift nut in the first embodiment of the invention.

The shaft is inserted from above the sink through the strainer and into the waste disposer below, as shown in FIG. 5. The support plate 22 remains above the sink, and supports the tool in position. A connection between the tool and the support plate is made by means of support arms 23, as shown in FIG. 7. There may be two or three or more of these, although the preferred embodiment contains three such arms.

The attachment between the arms and the shaft is shown in FIG. 7. Referring now to this figure, the support arms 23 are affixed to a nut 29, which engages an external thread 26 formed on the central portion of the shaft as seen in the drawing. An acme thread is used in the preferred embodiment, because of the strength and wear resistant qualities possessed by the acme thread.

Figure 4:
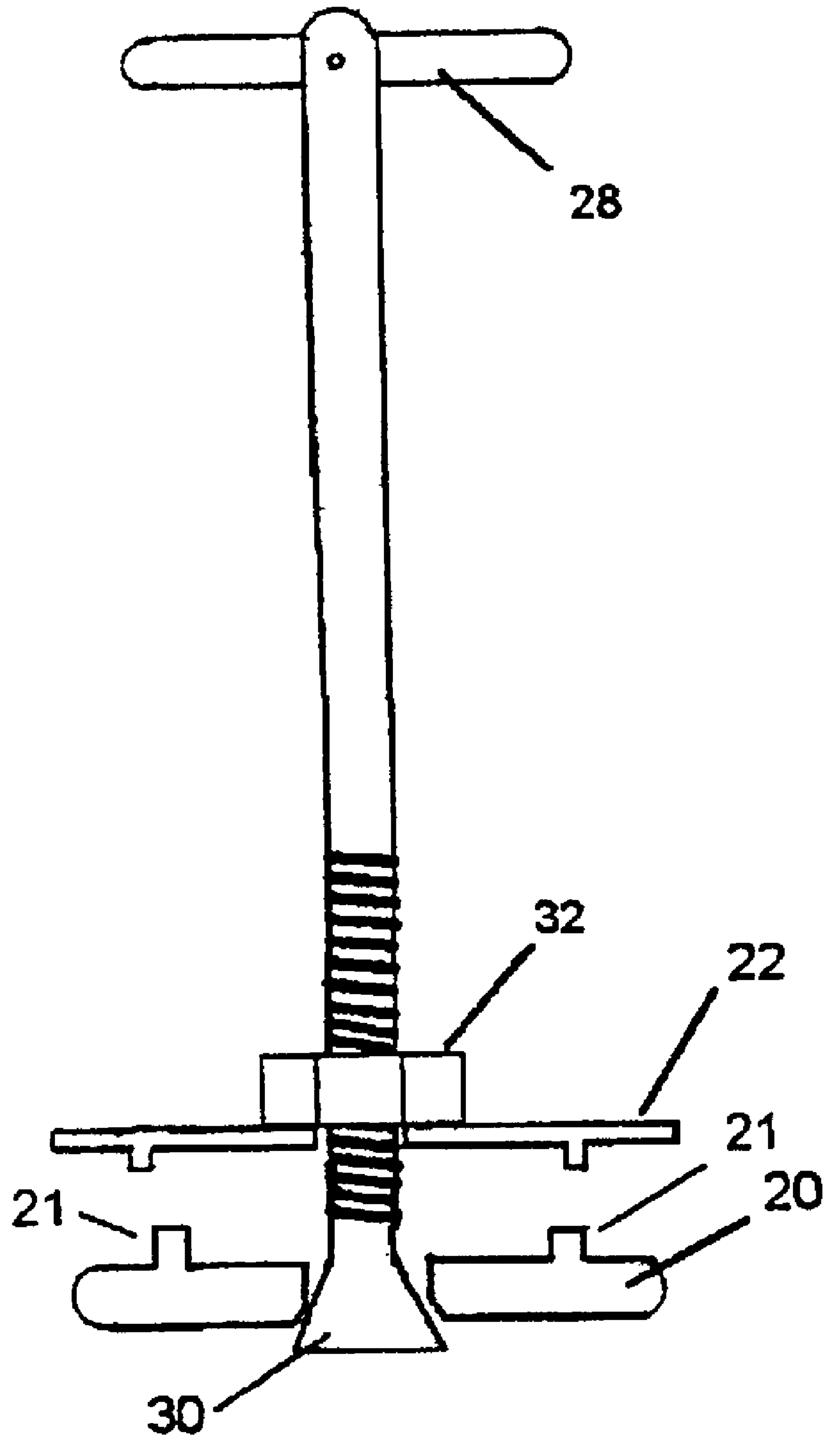
FIG. 4 depicts an embodiment of the present invention in which the lift screw is engaged in close proximity to the strainer plate.
Figure 9:
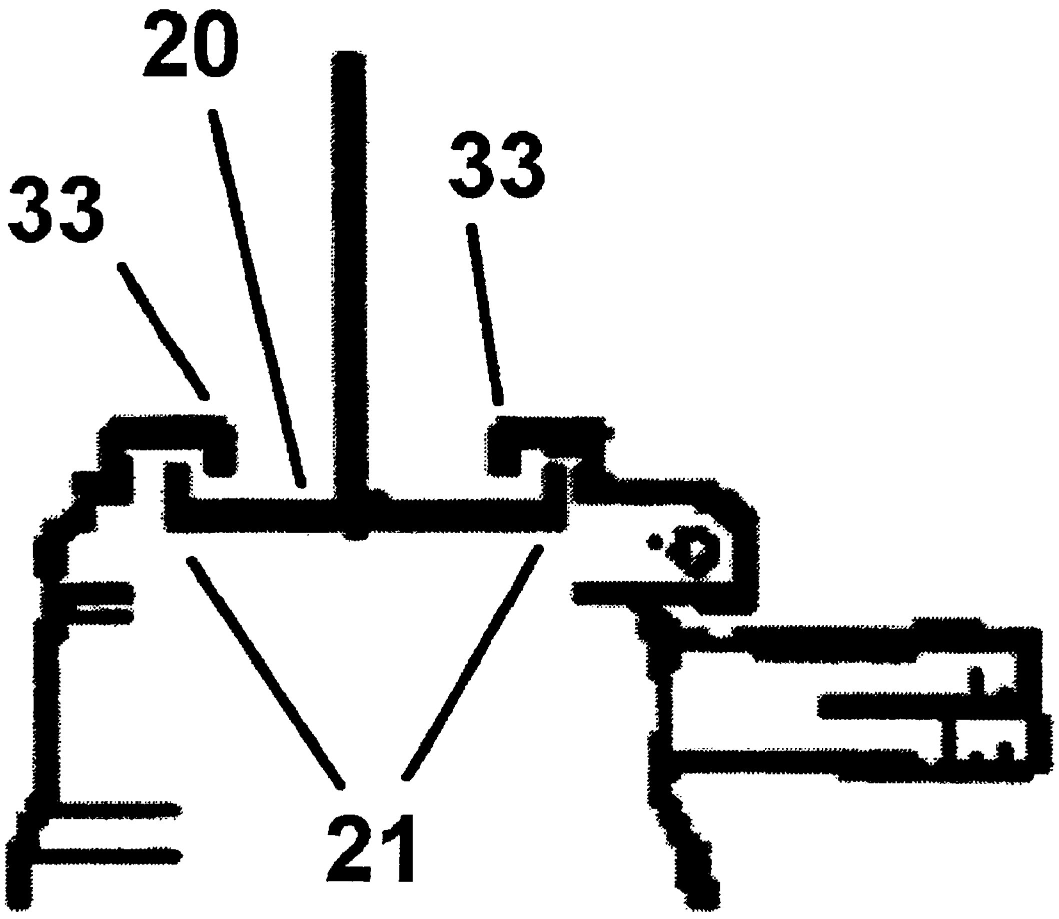
FIG. 9 depicts a detail of the engagement of the lift plate and the top of the waste disposer.

As the shaft is rotated while the support plate is maintained in a stationary position, the lift plate will rise or fall relative to the support plate, and therefore relative to the sink, depending upon the direction of rotation. Referring to FIG. 9, it is seen that the circular ridges 21, as shown in FIGS. 3 and 4, which are formed in the lift plate, engage with the lip 33 of the upper part of the waste disposer, providing a reliable connection.

Referring again to FIGS. 3 and 4, the shaft may be completely removed from the lift plate by rotating the shaft until the nut slips off the upper area of the external screw threads on the shaft. With the handle 28 rotated in alignment with the shaft, the shaft may then be pulled downward through the lift nut, and though the circular hole in the lift plate 20. However, once the tool is assembled with the lift plate in place above the flared shaft bottom 30, there is generally no need to totally disassemble the tool.

Rather, the tool is disposed above the sink, with the support plate flanges inserted into the circular top of the sink strainer, to help maintain the tool's position. The shaft is then rotated downward through the sink, until it is in proximity with the top of the waste disposer, which has been set on a support beneath the sink.

Figure 6:
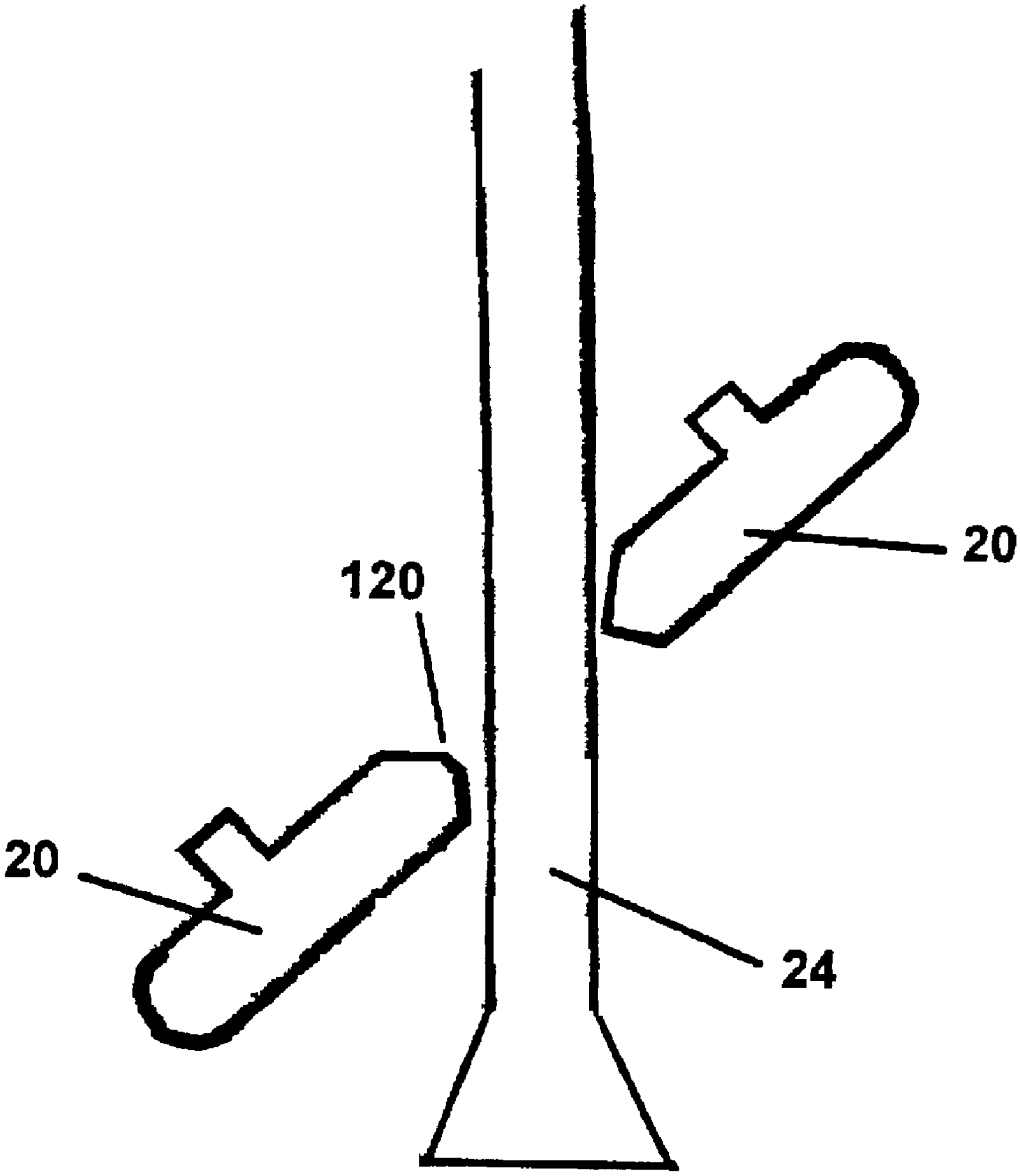
FIG. 6 depicts the tilting of the lift plate about the installation tool shaft in order to remove the lift plate from the waste disposer.

Referring now to FIG. 6, the lift plate is tilted with respect to the shaft by lifting the plate somewhat above the flared shaft end. In this position the support plate may be inserted first through the sink strainer, and then into the top of the waste disposer. Once inside, the support plate is allowed to fall into a horizontal position, so that when it is drawn upwards it will pull the entire waste disposer upwards, as shown in FIG. 5. As further seen in FIG. 9, the ridges 21 on the outer extremities of the lift plate will help maintain a positive and solid connection between the lift plate and the waste disposer.

The user may then continue to rotate the handle 28, drawing the waste disposer up until it is just touching the adapter. The user may then install the waste disposer body on the adapter by simultaneous rotating the waste disposer with one hand, and rotating the handle 28 of the tool with the other, until the waste disposer has reliably attached itself to the adapter, after which the user may complete the installation by rotating the waste disposer only.

Once the installation is thus completed, the user then rotates the handle in the direction to lengthen, rather than shorten, the distance between the flared shaft end and the support nut, so that the lift plate is lowered into the waste disposer sufficiently to allow the lift plate to tilt, as shown in FIG. 6, so that the lift plate may by be removed from the waste disposer upwards through the sink strainer.

A second embodiment of the invention is shown in FIG. 4, wherein the support arms are dispensed with entirely, and the lift nut is affixed directly to the lift plate, preferably by welding. As an alternative, the lift plate may contain a thickened center, into which the internal threads are formed.

The first embodiment, having lift arms, provides the advantage that the shaft may be more easily adjusted in case of a misalignment between the adapter and the top of the waste disposer, since in this first embodiment the center of rotation of the tool perpendicular to the shaft passes through the lift nut, and is thus substantially above the plane of the sink. This ability to adjust is enhanced further by attaching the lift arms to the lift nut or the lift plate by joints which are allowed to rotate, as in the case of a connection made by a pin engaging in a hole.

Figure 8:
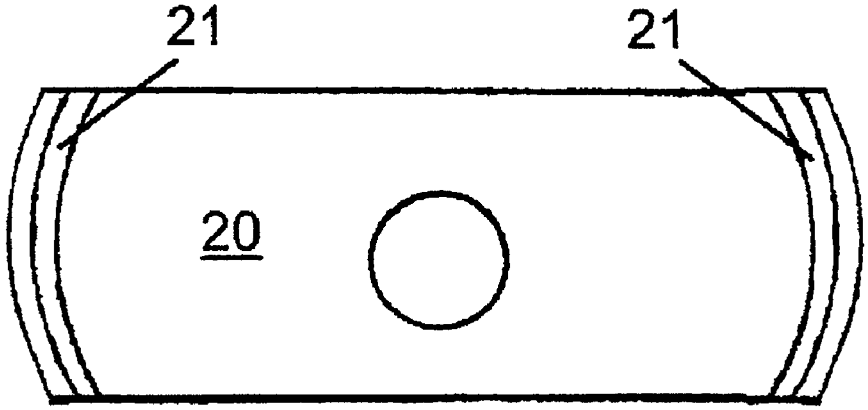
FIG. 8 depicts the lift plate in plan view.

Referring again to FIGS. 6 and 8, it should also be noted, first, that the lift plate is easiest manipulated if it does not form a complete circle, but is rather in the shape of a circle truncated at either side of the center. Further, the hole formed in the center of the lift plate is not square cut so as to form a cylinder, but rather has a sharpened, or pointed cross section, as seen in FIG. 6, having inner edges which lead outward at an angle of about 45 deg. coming to a point 120 in proximity to the shaft 24. This tapering, or beveling of the inner edges of the center hole allows the lift plate to mate perfectly with a flared bottom of the same angle when the lift plate is in a horizontal position, but allows the maximum rotation when the lift plate is tilted to enter or exit the top of the water disposer.

It is further noted that the if the lift plate center hole is of substantially greater diameter than the shaft, the lift plate will be able to tilt at a steeper angle, making the entry and exit from the sink strainer and from the top of the waste disposer easier.

Figure 10:
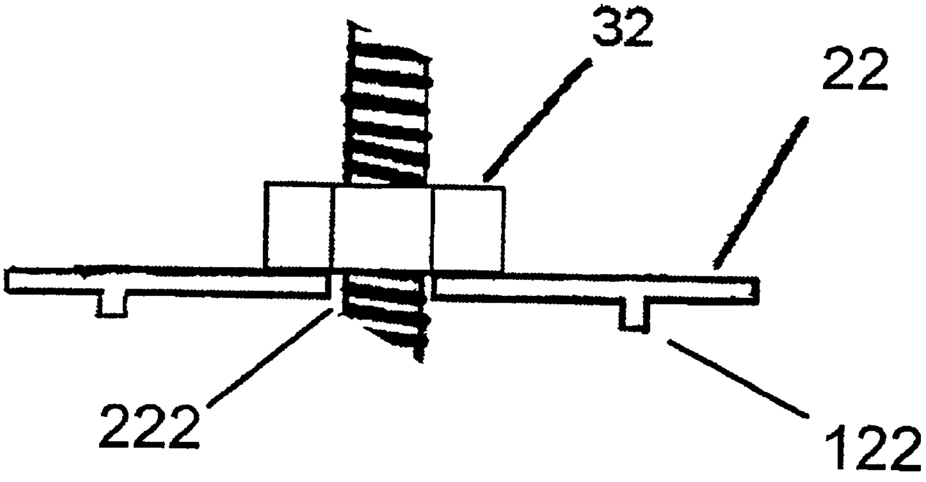
FIG. 10 depicts a detail of the support plate in elevation view.
Figure 11:
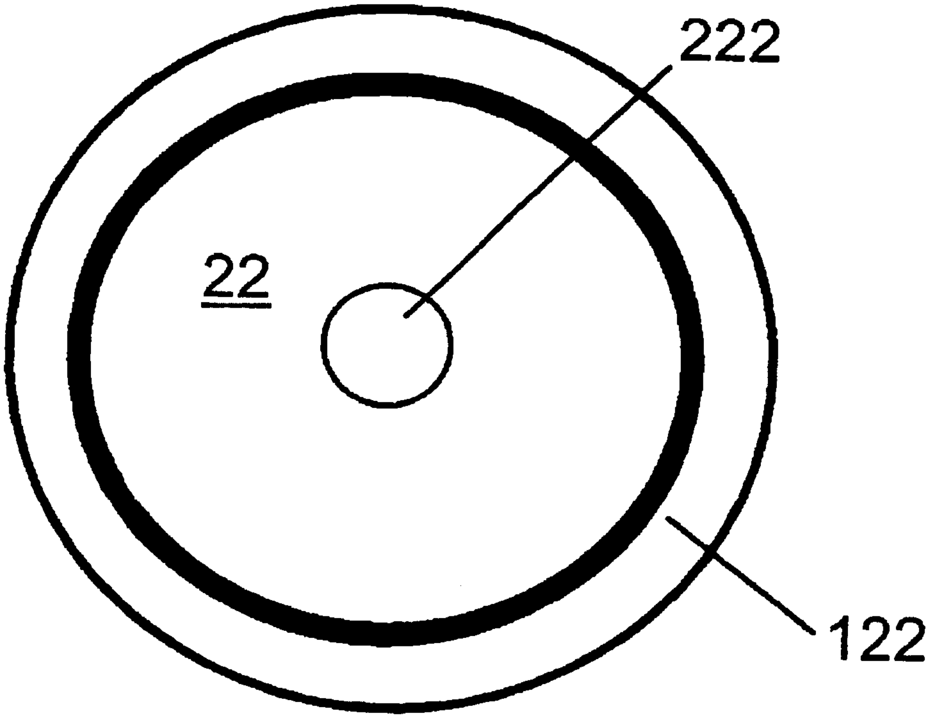
FIG. 11 depicts a detail of the support plate in top plan view.

Referring now to FIGS. 10 and 11, details of the support plate may be seen. The support plate 22 contains a center hole 222 through which the shaft is inserted. ridgeridgeA stabilizing ring 122 is integrally formed on the lower surface of the stabilizing plate, so that the plate remains in place within the sink strainer, as depicted in FIG. 5.

Figure 13:
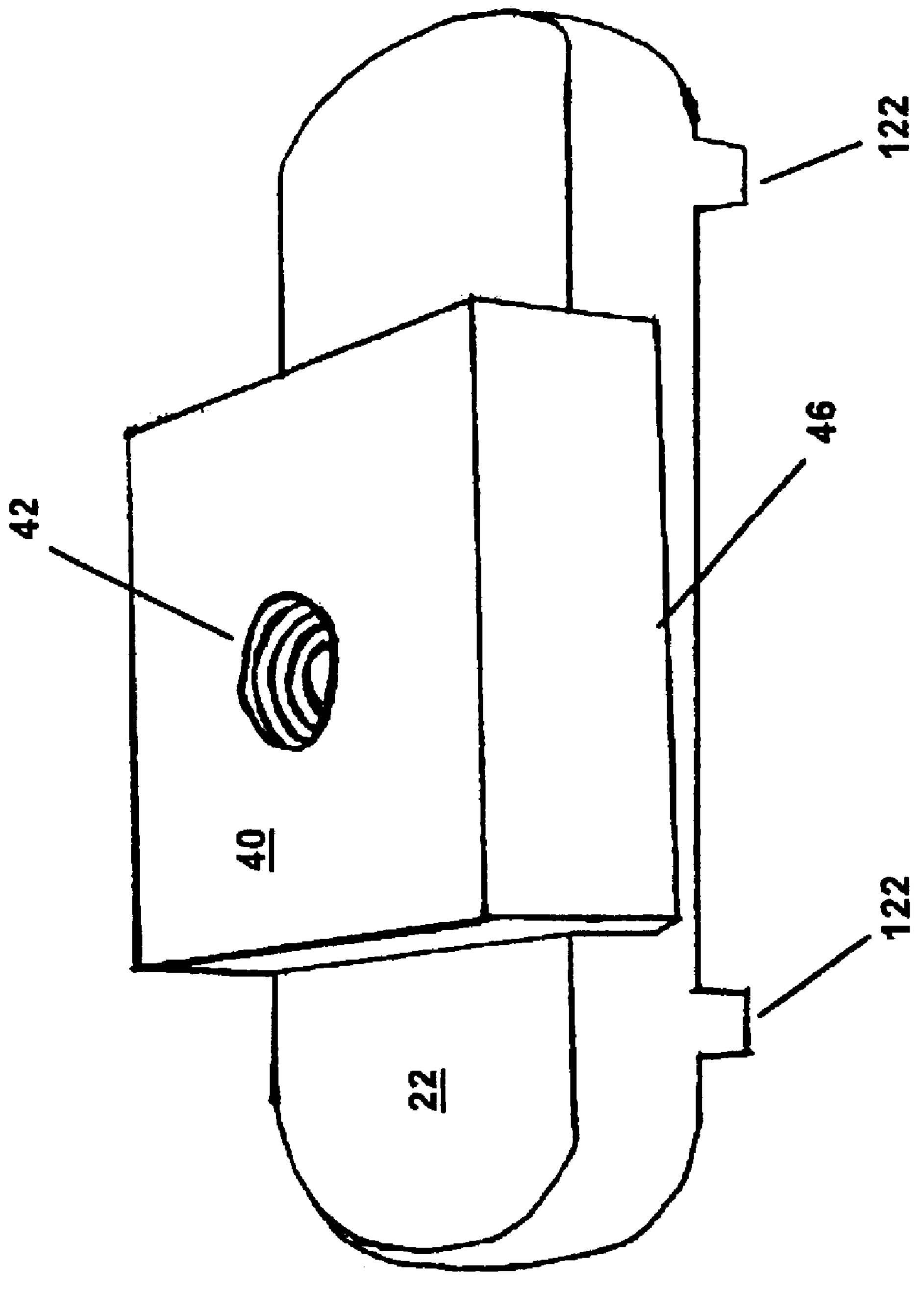
FIG. 13 depicts a perspective view of the stabilizing plate mated to the stabilizing plate retainer.

Referring now to FIG. 13, in a third embodiment of the invention, the stabilizing plate is connected to the lift plate by means of a stabilizing plate retainer 40. This retainer has a threaded hole 42 which engages the threads 26 of the thirdthirdtool's shaft, while the central hole formed in the stabilizing plate is a through hole of larger diameter, allowing the threaded portion of the shaft to pass freely through. Retaining flanges 46 on the front and rear sides of the retainer capture the stabilizing plate within when the retainer is fully mated with the stabilizing plate, as shown in FIG. 13.

It is noted that the stabilizing plate in this embodiment has a substantially rectangular form, to facilitate the type of mating between the stabilizing plate and the retainer as described herein.

Figure 14A:
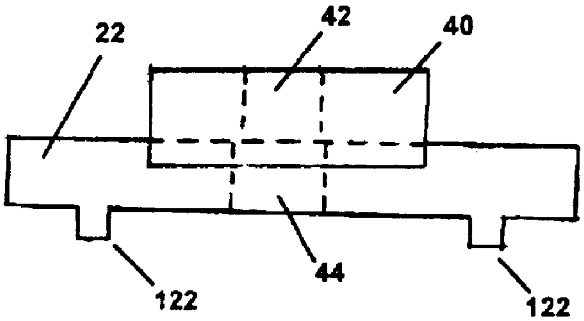
FIG. 14*a* depicts a side elevation view of the stabilizing plate mated to the stabilizing plate retainer.
Figure 14B:
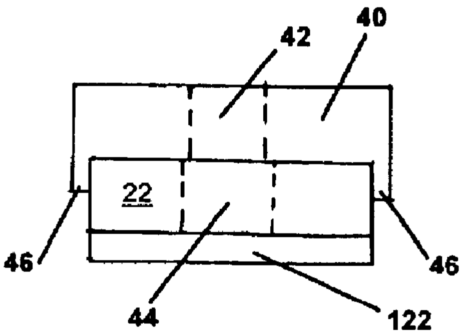
FIG. 14*b* depicts a front elevation view of the stabilizing plate mated to the stabilizing plate retainer.
Figure 15:
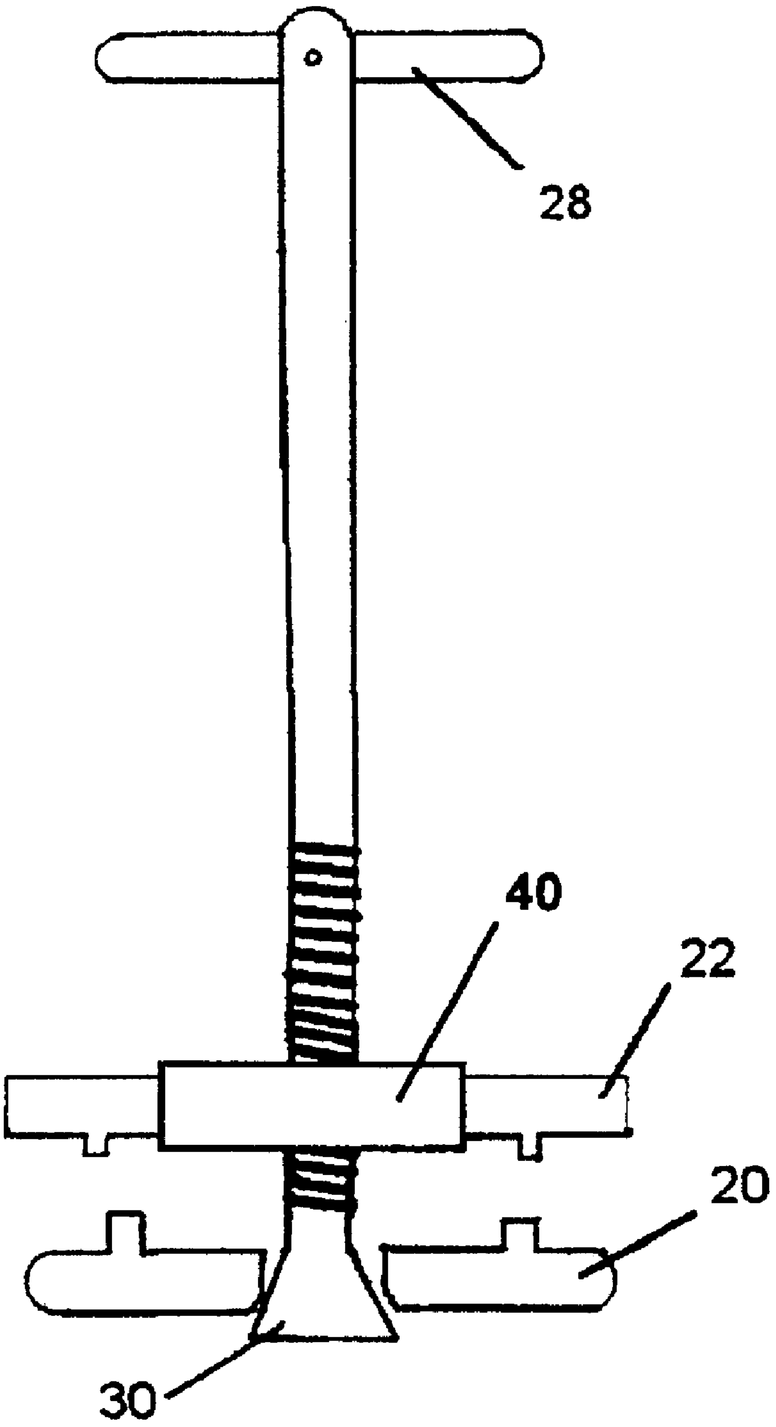
FIG. 15 depicts a side elevation view of the tool in the embodiment which includes the stabilizing plate retainer, the retainer mated with the stabilizing plate.

The stabilizing plate and stabilizing plate retainer are shown in side elevation view in FIG. 14*a*, and in front elevation view in FIG. 14*b*. Referring now to these figures, the relation of the through hole 44 of the stabilizing plate and the threaded hole 42 of the retainer are apparent. FIG. 14*b* depicts the retaining flanges 46 on either side of the stabilizing plate 22, preventing rotation of the stabilizing plate relative to the retainer.

Figure 12:
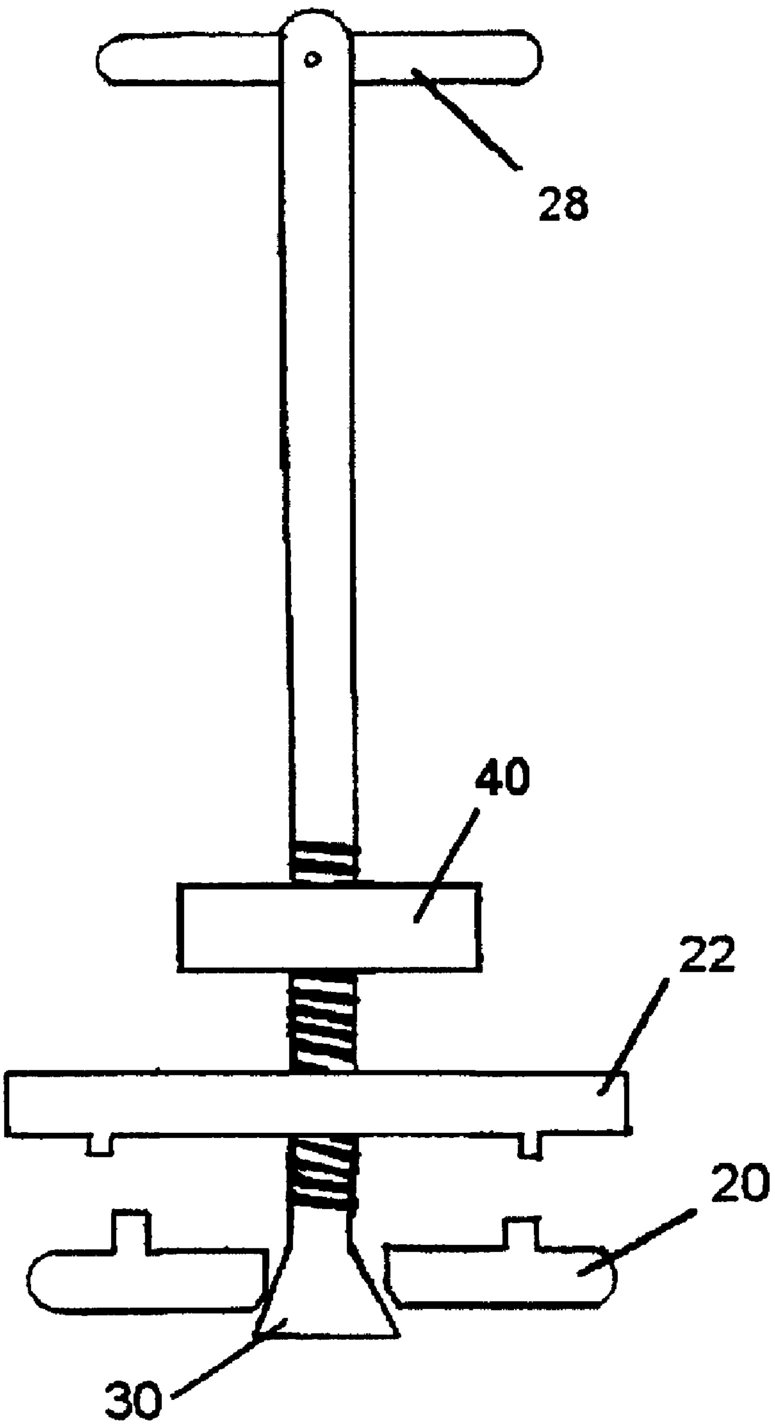
FIG. 12 depicts a side elevation view of a third embodiment of the tool, with the stabilizing plate retainer above the level of the stabilizing plate.

In operation, the tool is first inserted into the waste disposer while the retainer 40 is somewhat above the stabilizing plate 22, as shown in FIG. 12. With the stabilizing plate inserted into the top of the sink strainer, the user lowers the tool in the strainer until the retainer is fully mated with the stabilizing plate, the retaining flanges capturing the stabilizing plate as shown in FIGS. 13, 14*a* and 14*b*, and 15. The user may then rotate the handle 28 of the tool, drawing up the waste disposer, and using a single hand to do so.

The user will typically kneel in front of the sink, so that one hand is used to raise the waste disposer from above, while the other is used to adjust the waste disposer in the adapter connected to the bottom of the sink drain. The tool thus used allows the installer to quickly and easily install the waste disposer, without requiring the help of an additional person, and without the need for any additional tools or fixtures to aid in the mechanical phase of the installation.

The tool thus constructed, in accordance with any of the main embodiments, may be made from a variety of materials, including steel, brass, or plastic. Ordinary steel is strong and long-lasting, but subject to rust, while stainless steel does not rust, but is expensive. Low cost plastics, although not very wear resistant, could be sufficiently inexpensive that they could be supplied, together with the waste disposers, as throwaway tools.

Regardless of the materials used, the tool as described herein reduces the time for installation of the waste disposer sufficiently so that the tool would be paid for within an installation or two.

While the invention has been described with reference to specific embodiments, it will be apparent that improvements and modifications may be made within the purview of the invention without departing from the scope of the invention defined in the appended claims.

What is claimed is:

1. A tool to assist in the installation of a waste disposer in a sink, the sink comprising a sink strainer affixed thereto and having a top and a bottom and an adapter which mates with the bottom of the sink strainer, the tool comprising:

a) a central threaded shaft;

b) a lift plate having a lift plate hole formed therewithin, the shaft passing through the lift plate hole, the lift plate having a first position where it may enter or exit the top of the waste disposer, and a second position where it is restrained within the waste disposer;

c) a stabilizing plate into which a through hole is formed, through which the threaded shaft passes, and further comprising a plurality of projections which mate with a top of the sink strainer; and d) a stabilizing plate retainer disposed above the stabilizing plate and into which a threaded hole is formed which mates with the threads of the central shaft and which further comprises a plurality of retaining flanges formed thereupon, the retaining flanges disposed so as to capture the stabilizing plate within, so that when the lift plate is first brought into the first position, inserted through the sink strainer and into the top of the waste disposer, and then brought into the second position within the waste disposer, and the central shaft rotated, the waste disposer is drawn into contact with the adapter.

2. The tool of claim 1, wherein the hole in the center of the lift plate has tapered upper and lower edges.

3. The tool of claim 2, wherein the lift plate further comprises a circular ridge disposed on an upper surface which stabilizes the lift plate relative to the waste disposer.

4. The tool of claim 3, wherein the lift plate is in the shape of a circular plate truncated at either side of the center hole, forming a rectangle with two opposing curved sides.

* * * * *